United States Patent
Germann

(10) Patent No.: US 9,302,665 B2
(45) Date of Patent: Apr. 5, 2016

(54) BRAKE TEST BENCH HAVING AN ELECTRICAL BRAKE ACTUATOR AND METHOD FOR SAME

(71) Applicant: Horiba Europe GmbH, Darmstadt (DE)

(72) Inventor: Stefan Germann, Lorsch (DE)

(73) Assignee: Horiba Europe GmbH (DE)

( * ) Notice: Subject to any disclaimer, the term of this patent is extended or adjusted under 35 U.S.C. 154(b) by 424 days.

(21) Appl. No.: 13/717,895

(22) Filed: Dec. 18, 2012

(65) Prior Publication Data

US 2013/0174647 A1 Jul. 11, 2013

Related U.S. Application Data

(63) Continuation of application No. PCT/EP2011/002535, filed on May 20, 2011.

(30) Foreign Application Priority Data

Jun. 18, 2010 (DE) .......................... 10 2010 024 336

(51) Int. Cl.
*B60T 17/22* (2006.01)
*G01L 5/28* (2006.01)
*F16H 25/22* (2006.01)

(52) U.S. Cl.
CPC ................. *B60T 17/221* (2013.01); *G01L 5/28* (2013.01); *B60T 2270/406* (2013.01); *F16H 25/2252* (2013.01)

(58) Field of Classification Search
CPC ........... G01L 5/28; G01M 17/00; B60T 17/22
See application file for complete search history.

(56) References Cited

U.S. PATENT DOCUMENTS 3,974,688 A 8/1976 Cline
5,975,250 A * 11/1999 Brandmeier et al. ... 188/1.11 W
(Continued)

FOREIGN PATENT DOCUMENTS

DE 4303420 A1 8/1993
DE 19736734 C2 1/1999
(Continued)

OTHER PUBLICATIONS

International Search Report of PCT/EP2011/002535 dated Aug. 3, 2011.
(Continued)

*Primary Examiner* — Paul West
(74) *Attorney, Agent, or Firm* — Mayback & Hoffman, P.A.; Gregory L. Mayback; Rebecca A. Tie

(57) ABSTRACT

A test bench for testing a brake comprises a pressure generating assembly for providing a brake fluid with an increased hydraulic pressure, a test bench control, and an electromechanical brake actuator. The pressure generating assembly is actuated mechanically and the brake fluid is supplied to the brake to actuate the brake. The electromechanical brake actuator, which simulates a vehicle driver's braking foot, is provided for mechanical actuation of the pressure generating assembly. The brake actuator comprises an electric motor activated by the test bench control and a planetary roller screw drive driven by the electric motor. The planetary roller screw drive is mechanically coupled to the pressure generating assembly to mechanically actuate the pressure generating assembly.

12 Claims, 2 Drawing Sheets

(56) References Cited

U.S. PATENT DOCUMENTS

| | | | |
|---|---|---|---|
| 6,098,479 A | 8/2000 | Hoermansdoerfer et al. | |
| 6,213,253 B1* | 4/2001 | Paul et al. | 188/1.11 W |
| 2002/0020591 A1 | 2/2002 | Schanzenbach et al. | |
| 2006/0214453 A1* | 9/2006 | Gerhardt | 296/57.1 |
| 2007/0137329 A1* | 6/2007 | Everson et al. | 74/89.23 |

FOREIGN PATENT DOCUMENTS

| | | |
|---|---|---|
| DE | 19747074 A1 | 4/1999 |
| DE | 10123828 C1 | 10/2002 |
| DE | 69807187 T2 | 5/2003 |
| DE | 20203794 U1 | 9/2003 |
| EP | 0 689 042 A2 | 12/1995 |
| EP | 1 655 513 A1 | 5/2006 |
| EP | 2 100 784 A2 | 9/2009 |
| WO | 2011157343 A1 | 12/2011 |

OTHER PUBLICATIONS

International Preliminary Report of Patentability of PCT/EP2011/002535 dated Apr. 16, 2012.

* cited by examiner

BRAKE TEST BENCH HAVING AN ELECTRICAL BRAKE ACTUATOR AND METHOD FOR SAME

CROSS-REFERENCE TO RELATED APPLICATIONS

This application is a continuing application, under 35 U.S.C. §120, of copending international application No. PCT/EP2011/002535, filed May 20, 2011, which designated the United States and was not published in English; this application also claims the priority, under 35 U.S.C. §119, of German Patent Application No. 10 2010 024 336.1, filed Jun. 18, 2010; the prior applications are herewith incorporated by reference in their entirety.

STATEMENT REGARDING FEDERALLY SPONSORED RESEARCH OR DEVELOPMENT

Not Applicable

FIELD OF THE INVENTION

The present invention lies in the field of brakes. The present disclosure relates to a brake test bench having an electrical brake actuator and a method for improving the repeat accuracy of the simulated brake applications.

BACKGROUND OF THE INVENTION

Brake test benches serve to test, in particular, vehicle brakes, for example, with regard to wear and tear, coefficient of friction, noise emission, fatigue strength, power, etc. For this purpose, the brake to be tested is connected to the test bench. Therein, it is, on one hand, possible to install the brake in the test bench as an independent component and to connect it to the test bench components there. On the other hand, it is also possible to install a complete vehicle or even parts of the vehicle (axle components, etc.) in the test bench and then to connect the brake to be tested to the test bench. The brake, on its part, is driven and/or loaded by a dynamometer on the test bench side in known manner.

In all of these cases, the brake pressure required for actuating the brake is generated and provided by the test bench. The only item forming the unit under test is the actual brake, which, e.g., substantially comprises a brake disk and a caliper carrying the brake pads and brake pistons. The test bench generates the brake pressure and provides the brake fluid with an appropriate brake pressure.

In line therewith, a pressure generating assembly is provided in the test bench, the pressure generating assembly comprising a brake master cylinder. The brake master cylinder is to be actuated in the same manner as the brake master cylinder in a vehicle. In line therewith, the brake master cylinder of the test bench must be actuated in the same manner as the brake master cylinder in a vehicle in order to test the brake as closely to reality as possible. For this reason, to be able to test a vehicle brake that is actuated hydraulically, a vehicle driver's braking foot must be simulated on the test bench. It is known to provide an actuator for generating the pressure, e.g. simulating the braking foot and, therefore, actuating the brake system.

As a general rule, the brakes of passenger vehicles and light trucks are actuated hydraulically. To be able to operate these brake systems in test benches through an actuator, both the reachable (maximum) pressure and the pressure gradients (rate of building up the pressure) must be reached at least as well as in a real vehicle. This means that the actuator must build up a brake pressure of at least 250 bar with a pressure gradient of at least 200 bar per second. In line therewith, considerable power requirements must be met by the actuator.

In the past, various systems were used on test benches for the actuator to simulate the driver's foot and, therefore, to apply the pedal force when the brake is actuated. For example, there exist what are referred to as pneumatic/hydraulic transformers in which the brake actuator for generating the pedal force and, therefore, for actuating the brake master cylinder is operated pneumatically (pneumatic primary circuit) whereas the actual braking circuit (secondary circuit) is configured hydraulically (hydraulic brake system). Likewise, there exist hydraulic/hydraulic systems in which the actuator in the primary circuit is driven hydraulically as well. Therein, a pressure is generated in the primary circuit through a hydraulic pump and the pressure is transmitted to the secondary circuit (vehicle brake system) with the brake fluid through a valve and a hydraulic master cylinder, this being achieved through an actuation rod.

In these systems, considerable complexity in terms of construction (special valves, friction-reduced and force-lubricated cylinders) is required to achieve particularly the dynamics mentioned above (high pressure gradient).

A two-station gyrating mass brake test bench is disclosed in German Patent DE 101 23 828 C1, in which the driver's foot is simulated by an actuator. Therein, the complete brake system of a vehicle, including the brake master cylinder of the vehicle, is tested. A controllable electric drive with spindle drive can be used as an actuator.

Furthermore, so-called brake assists are known, which additionally support the build-up of pressure in the brake system through an electrically driven auxiliary actuator. In case of an emergency brake application, the braking force the driver applies through the brake pedal can, therefore, be supported by the auxiliary actuator. A corresponding example is shown in European Patent Application EP 2 100 784 A1 corresponding to U.S. Pat. No. 7,922,264 to Baumann et al.

Thus, a need exists to overcome the problems with the prior art systems, designs, and processes as discussed above.

SUMMARY OF THE INVENTION

The invention provides a brake test bench having an electrical brake actuator and a method for improving the repeat accuracy of the simulated brake applications that overcome the hereinafore-mentioned disadvantages of the heretofore-known devices and methods of this general type and that provide such features with simulating a vehicle driver's foot with a brake actuator and with an appropriate braking force and a sufficient pressure build-up rate. Therein, it is not intended to modify the brake system in the vehicle comprising the brake but, rather, to maintain the brake hydraulic system that is usually present.

A test bench for a brake comprises a pressure generating assembly for providing a brake fluid with an increased hydraulic pressure. The pressure generating assembly can be actuated mechanically and the brake fluid can be supplied to the brake in order to actuate the brake. Furthermore, an electromechanical brake actuator is provided for mechanical actuation of the pressure generating assembly. The test bench is characterized in that the brake actuator comprises an electric motor that can be activated by a test bench control and a planetary roller screw drive that is driven by the electric motor. The planetary roller screw drive is mechanically coupled to the pressure generating assembly to mechanically actuate the pressure generating assembly.

Therein, the brake itself is not an integral part of the test bench but forms the unit under test. Therefore, the brake actuator comprises the electric motor and the planetary roller screw drive driven by the electric motor. Such a planetary roller screw drive is, for example, known from European Patent Application EP 1 655 513 A1 corresponding to U.S. Patent Publication Nos. 2006/0196293 and 2006/0214453 to Gerhardt, and which is incorporated herein by reference. In a planetary roller screw drive, the electric motor drives a planetary gear set in a rotary movement, the planetary gear set rolling in an internal thread, thereby changing its position in axial direction. A brake actuator that is configured in such a manner allows for producing high forces within a very short time, which can then accordingly generate high brake pressures for the brake to be tested through the brake pressure generating assembly. The braking foot of a vehicle driver can be excellently simulated by such a configuration without having to put up with curtailments therein.

In fact, the electric motor can be activated with high precision by a corresponding control, in order to be able to simulate the typical braking behavior of a vehicle driver as closely to reality as possible.

An example of a planetary roller screw drive is described in detail in European Patent Application EP 1 655 513 A1, so that it is not necessary to provide an exhaustive description herein. In principle, the planetary roller screw drive comprises a housing bushing with an internal thread, a drive shaft that can be driven by the electric motor, a roller cage that can be driven in a rotary movement by the drive shaft, and a plurality of axles carried by the roller cage. The axles extend in parallel to the drive shaft and each carry at least one planetary roller in a rotating manner. Therein, the planetary rollers comprise at their outer perimeter a thread profile corresponding to the thread profile of the internal thread of the housing bushing. During a revolution of the drive shaft and the roller cage, the planetary rollers can rotate in the internal thread and, therefore, produce an axial relative movement between the planetary rollers and the housing bushing.

The axial relative movement must be supported appropriately at the test bench, with the result that it can be used to mechanically actuate the pressure generating assembly of the test bench.

For example, the planetary roller screw drive can comprise a plunger or be coupled to a plunger, with the result that the axial relative movement mentioned can produce an axial bidirectional movement of the plunger. In such a case, the plunger corresponds to an actuation rod that acts upon the pressure generating assembly (for example, a brake master cylinder), similar to a brake pedal in a vehicle.

The invention, therefore, does not relate to the use of electric brake systems in a passenger vehicle in which, as a general rule, the brake hydraulic system is completely replaced with an electrical brake actuator. In the test bench according to the invention, the hydraulic braking principle is, rather, still maintained to its full extent. According to the invention, it is nothing but the brake actuator—the driver's braking foot in the vehicle, the pneumatic or hydraulic transmitter in present test benches—that is formed by an electric motor with servo converter and planetary roller drive.

The brake actuator can comprise a position detecting assembly for detecting the current position of the plunger. What is also to be understood here is that, for example, the revolutions of the rotor in the electric motor are detected. Due to the configuration of the planetary roller screw drive, a fixed relationship is defined—as it is form-locking—between the rotor revolutions of the motor and the particular axial relative movement and, therefore, the position of the plunger. It is always the same plunger position that is reached with a defined number of rotor revolutions.

In line therewith, the position detecting assembly comprises a rotary encoder, a Hall sensor, an inductive proximity sensor, or a capacitive proximity sensor. The encoders or sensors can, for example, be in or on the electric motor, in or on the planetary roller screw drive as well as in the environment of the plunger, in order to detect the axial movement of the plunger. If the motor is a servo motor, for example, with a PWM control, the motor speed and motor rotational speed can be defined by the control with high precision.

The test bench control can be connected to a motor control for the electric motor, wherein the motor control comprises, for example, a converter and a servo regulator. As a result, it is possible that the test bench control, which individually controls and monitors the test operations for the brake each time, activates the brake actuator and, therefore, particularly the electric motor in order to achieve the desired actuation of the brake.

The pressure generating assembly can comprise a brake master cylinder, a pressure piston that can be axially moved in the brake master cylinder because of the effect of the brake actuator, and a storage tank for the brake fluid that is connected to the brake master cylinder through a supply line. In this respect, the pressure generating assembly forms a part of a classical hydraulic brake system, this part being known as such. For example, the brake actuator then acts on the brake master cylinder through the plunger mentioned, such as this is possible by a brake pedal in a vehicle.

A brake line can be provided for connecting the brake master cylinder to the brake to be tested. As has already been described above, the brake forms the actual unit under test that does not pertain to the test bench, whereas the brake master cylinder and/or the pressure generating assembly should be an integral part of the test bench, however, not of the vehicle. In line therewith, the brake line represents the connection between the test bench side (brake master cylinder) and the unit under test (brake). The brake line on the test bench side can then be connected to the brake not pertaining to the test bench in the usual manner.

In a variant, a bypass line connecting the supply line and the brake line can be provided. A bypass valve that can be activated is disposed in the bypass line, and the bypass valve can be activated such that the bypass valve is open when the test bench control does not request any actuation of the brake, and that the bypass valve is closed when the test bench control requests an actuation of the brake. In line therewith, the test bench control switches the bypass valve and opens and closes the bypass line. The bypass line is only closed when an actuation of the brake is requested and, therefore, the brake pressure is to be built up. In the other cases, the bypass line can be opened.

This variant is advantageous because it is always possible to completely relieve the pressure in the brake system. An advantage of a classical hydraulical actuation in the primary circuit (brake actuator side) is the easy and reliable treatment of failures. In the event of a failure, the pressure in the primary circuit should always be completely relieved or at least be reduced, in order to be able to accordingly decrease the brake pressure on the secondary side as well. This is to ensure that, for example, the load can be removed from an overheating vehicle brake within a very short time, in order to protect the brake. In a hydraulically configured primary circuit, it is always possible to achieve an easy and immediate reduction of the pressure in the secondary circuit of the brake system if the pump provided for generating the supply pressure in the primary circuit can be switched off. If, however, an electrically driven brake actuator is provided in the primary circuit—as it is described herein—it is not possible to relieve the pressure spontaneously. Due to the friction in the mechanical components (electric motor, planetary roller screw drive), the pressure on the primary side, i.e. the pressure acting on the brake master cylinder, cannot be relieved at the desired rate. Even if the electric current for the electric motor is switched off, there will still always remain a significant residual pressure in the system. For this reason, the bypass valve described above, which is disposed in parallel to the brake master cylinder and can be switched by the test bench control, is suggested. In the event of the brake application being turned off, it is therefore possible to spontaneously depressurize the brake system (secondary circuit) without the encoder (brake actuator, primary side) at the brake master cylinder having to be completely moved out of the cylinder and a bottom check valve present in the brake master cylinder opening.

The brake master cylinder can comprise the mentioned bottom check valve, through which a hydraulic pressure present in the brake master cylinder can be completely relieved when the bottom check valve is open. The bottom check valve can be opened and closed, particularly subject to a position of the pressure piston in the brake master cylinder, wherein the bottom check valve is open when the pressure piston is in an initial position. This structure of a brake master cylinder is known as such and, therefore, does not require any exhaustive description.

In a variant, the test bench is configured so that the following states can be successively reached in case of a brake application:
  open state: pressure piston in open position (first position), bottom check valve open, bypass valve open;
  reference state: pressure piston axially displaced to a second position, bottom check valve closed by the pressure piston, bypass valve open;
  brake state: pressure piston axially displaced to the second position or to a further third position that is axially more remote from the first position than the second position, bottom check valve closed by the pressure piston, bypass valve closed by the test bench control.

This variant is based on the following consideration: to achieve reproducible test results, it is required to reach as good a repeat accuracy as possible during the individual brake applications. To achieve this, what must be particularly possible with a high repeat accuracy is the build-up of pressure during the brake applications. Due to the physical properties of seals and rubber elements in hydraulic systems (here, particularly in the brake master cylinder), their position and/or orientation often fails to be biunique. In fact, different positions are possible with respect to the elastic components, as a result of which, different pressures can be built up respectively.

As a general rule, the pressure is built up in that, initially, the plunger is actuated until the bottom check valve in the brake master cylinder closes. Subsequently, the pressure is built up in the secondary circuit and, therein, the rubber elements and seals in the brake master cylinder are deformed. This pressure build-up continues until the desired maximum brake pressure is reached.

Because it is not possible to exactly define the position of the pressure point, i.e., the position of the pressure piston starting at which the brake pressure is built up, in relation to the position of the plunger, there were considerations in the past to remove the bottom check valve in the brake master cylinder and to achieve a closed braking circuit in this manner. However, this is disadvantageous because, if the brake fluid is heated and, in connection therewith, expanded, it is no longer possible to reach zero (0) bar even if the encoder (brake actuator) moves back completely. Here, a certain minimum pressure remains in the system, this minimum pressure not ensuring that the brake is completely switched off. Due to the then missing bottom check valve, it is no longer possible to relieve the pressure completely.

However, this drawback can be averted by the variant presently described. Therein, particularly the bottom check valve remains preserved in the brake master cylinder. While the bypass line is still open, the brake actuator will then move the bottom check valve to its closed position by moving the pressure piston. The braking circuit is still depressurized during this step.

By closing the bottom check valve to a predefined reference position, reproducible conditions are created for the rubber bearings and seals, particularly in the brake master cylinder. The rubber bearings and seals are then moved or flipped to a position in which they remain even if the brake pressure is increased.

Only then will the bypass valve be closed—through a command of the test bench control—with the result that the actual brake application can start.

If, therein, the brake fluid heats up and expands accordingly, the pressure piston in the brake master cylinder can be moved back after completion of the brake application as far as necessary for the bottom check valve to be opened again. Pressurized brake fluid can then flow out to completely relieve the pressure in the secondary circuit.

In this manner, reproducible conditions are achieved in the secondary circuit (braking circuit). Due to the presence of the bottom check valve, this method allows leveling even low pressures in case of thermally demanding brake applications (expansion of the brake fluid medium because the brake is heated, for example in case of a long-term brake application to simulate downhill drives) in a reliable and safe manner. Furthermore, reproducible test brake applications are possible by means of a defined position of the bottom check valve without still having to deform seals or rubber elements in the brake master cylinder during the actual build-up of pressure (after the bottom check valve has closed), which seals or rubber elements would impair or at least alter the build-up of pressure.

Although the invention is illustrated and described herein as embodied in a brake test bench having an electrical brake actuator and a method for improving the repeat accuracy of the simulated brake applications, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

Figure 1:
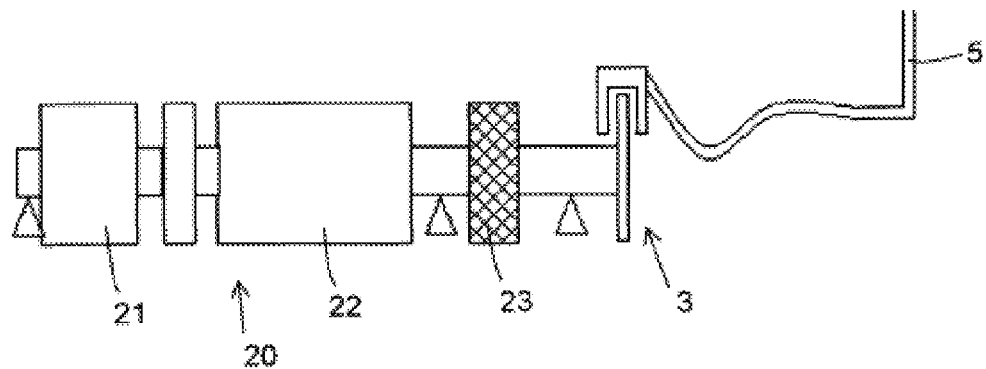
FIG. 1 is a fragmentary, schematic side elevational view of an exemplary embodiment of a brake test bench.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIG. 1, there is shown a first exemplary embodiment of a test bench. The test bench is configured in a manner that is known as such and comprises a transmission output shaft 20 having a flywheel 21, a dynamometer 22 and a torque measuring assembly 23. As a matter of course, the transmission output shaft 20 can be subdivided into a plurality of partial sections that are, e.g., connected to each other by conventional propeller shafts.

A vehicle brake 3, which represents the actual unit under test and is not an integral part of the test bench, is attached to one end of the transmission output shaft 20. The hydraulic or brake pressure required for actuating the vehicle brake 3 is provided through a brake line 5 that is illustrated in the context of the overall brake system based on FIG. 2.

Figure 2:
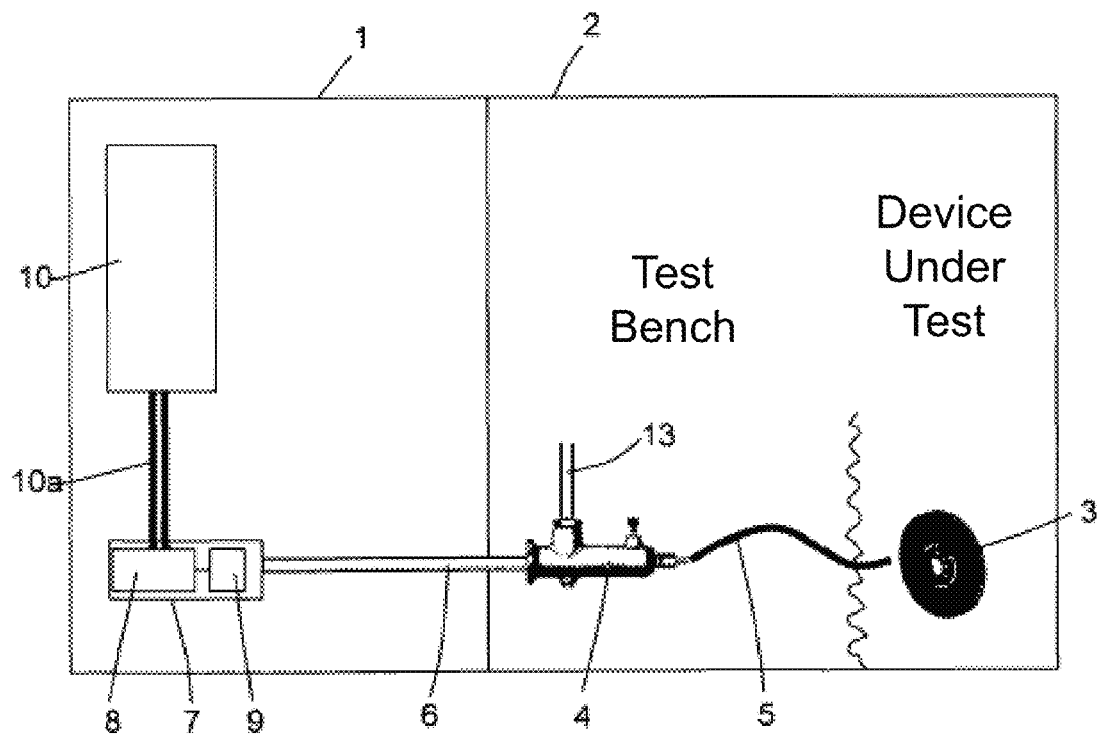
FIG. 2 is a fragmentary, diagrammatic view of the brake system of the brake test bench of FIG. 1 with a unit under test.

FIG. 2 is a partial view of the components of the brake system, which are required for actuating the brake. The schematic view of FIG. 2 makes a distinction between a primary circuit 1 and a secondary circuit 2. The primary circuit 1 is based on an electrical or electromechanical active principle and serves to simulate a vehicle driver's braking foot. The force generated therein will, then, act on the actual brake system, which is shown in the secondary circuit 2 and is based on a hydraulic active principle. The vehicle brake 3 that serves as the unit under test is also shown as an integral part of the secondary circuit, but is not an integral part of the test bench itself.

The usual components, for example, the brake disk shown in FIGS. 1 and 2, but also the brake pads, brake pistons, brake caliper, etc, are provided on the vehicle brake 3. Because the brake pistons are moved by the brake fluid provided by the brake system under pressure, the vehicle brake 3 is, therefore, also a part of the secondary circuit 2 although it is not an integral part of the test bench.

A brake master cylinder 4, which is fed with brake fluid from a storage tank (not shown) in a conventional manner is provided in the secondary circuit 2. The brake master cylinder 4 serves to build up a pressure in the brake fluid, this pressure being supplied to the vehicle brake 3 through a brake line 5. As a result, the vehicle brake 3 can be connected to the brake line 5 when the unit under test is installed in the test bench.

A pressure piston (not shown) and a bottom check valve, which is known as such and through which a hydraulic pressure present in the brake master cylinder 4 can be completely relieved when the bottom check valve is open, is provided in the brake master cylinder 4. If a brake pressure is to be built up, the bottom check valve can be closed by an axial displacement of the pressure piston.

The displacement of the pressure piston in the brake master cylinder is achieved by an actuation rod or a plunger 6, which is a part of a brake actuator 7. The brake actuator 7 comprises an electric motor 8 and a planetary roller screw drive 9 driven by the electric motor 8. The axial length of the brake actuator 7 changes because the planetary roller screw drive 9 is driven in a rotary movement, with the result that the plunger 6 is dislocated and displaces the pressure piston in the brake master cylinder 4 in the axial direction. This results in a generation or increase of the brake pressure.

By activating the electric motor 8 accordingly, it is therefore possible to build up and change the brake pressure at the vehicle brake 3 to almost any degree desired and with almost any rate profile (pressure gradient) desired.

To achieve this result, a motor control that, on its part, can be an integral part of the test bench control or is activated by the test bench control is provided. The motor control 10 is connected to the electric motor 8 through electric lines 10*a* and can, in particular, comprise a converter with a servo regulator in order to be able to activate the electric motor 8 precisely.

It can be advantageous for the number of rotor revolutions to be exactly predefined in the electric motor and produced by the motor control 10 because, due to the form-locking effects in the planetary roller screw drive 9, the rotor revolutions compulsorily produce an appropriate axial displacement of the plunger 6. This means that, if the electric motor 8 is activated with high precision, the plunger 6 can also be moved with the corresponding precision.

It is likewise possible to determine the position of the plunger 6 by suitable encoders or transducers and to feed it back to the test bench control.

The planetary roller screw drive 9 is known as such and is, for example, described in European Patent Application EP 1 655 513 A1. Therein, for example, a bushing-type housing as well as an adjustment component disposed in the housing can be provided, the adjustment component coming out of a front-faced opening of the bushing-type housing with its end region. The adjustment component can be adjusted axially in relation to the bushing-type housing by a rotary drive, for example, the electric motor 8, and through the planetary roller drive 9. The bushing-type housing is disposed in a non-rotatable manner and provided with a thread on its cylindrical interior wall. The electric motor, which has a drive shaft that is coaxial in relation to the bushing-type housing, is disposed at the likewise non-rotatable adjustment component, wherein a roller cage can be rotatably driven by the drive shaft about the longitudinal axis of the bushing-type housing. The roller cage comprises a plurality of axles that are parallel to the longitudinal axis of the bushing-type housing, with planetary rollers having grooves corresponding to the profile of the thread being freely pivoted on each of the axles. The planetary rollers engage the thread of the bushing-type housing with their grooves that correspond to the profile of the thread.

When the electric motor is actuated and, therefore, its drive shaft rotated, the roller cage is rotated as well, resulting in the planetary rollers rolling on the interior side of the housing, i.e., in the internal thread that is disposed there. The rolling of the planetary rollers generates an axial movement that produces a relative movement between the bushing-type housing and the adjustment component. In line therewith, the adjustment component moves out from and into the housing. This axial linear movement can be transmitted to the brake master cylinder 4 and, there, particularly to the displaceable pressure piston either directly or through a suitable lever configuration.

Figure 3:
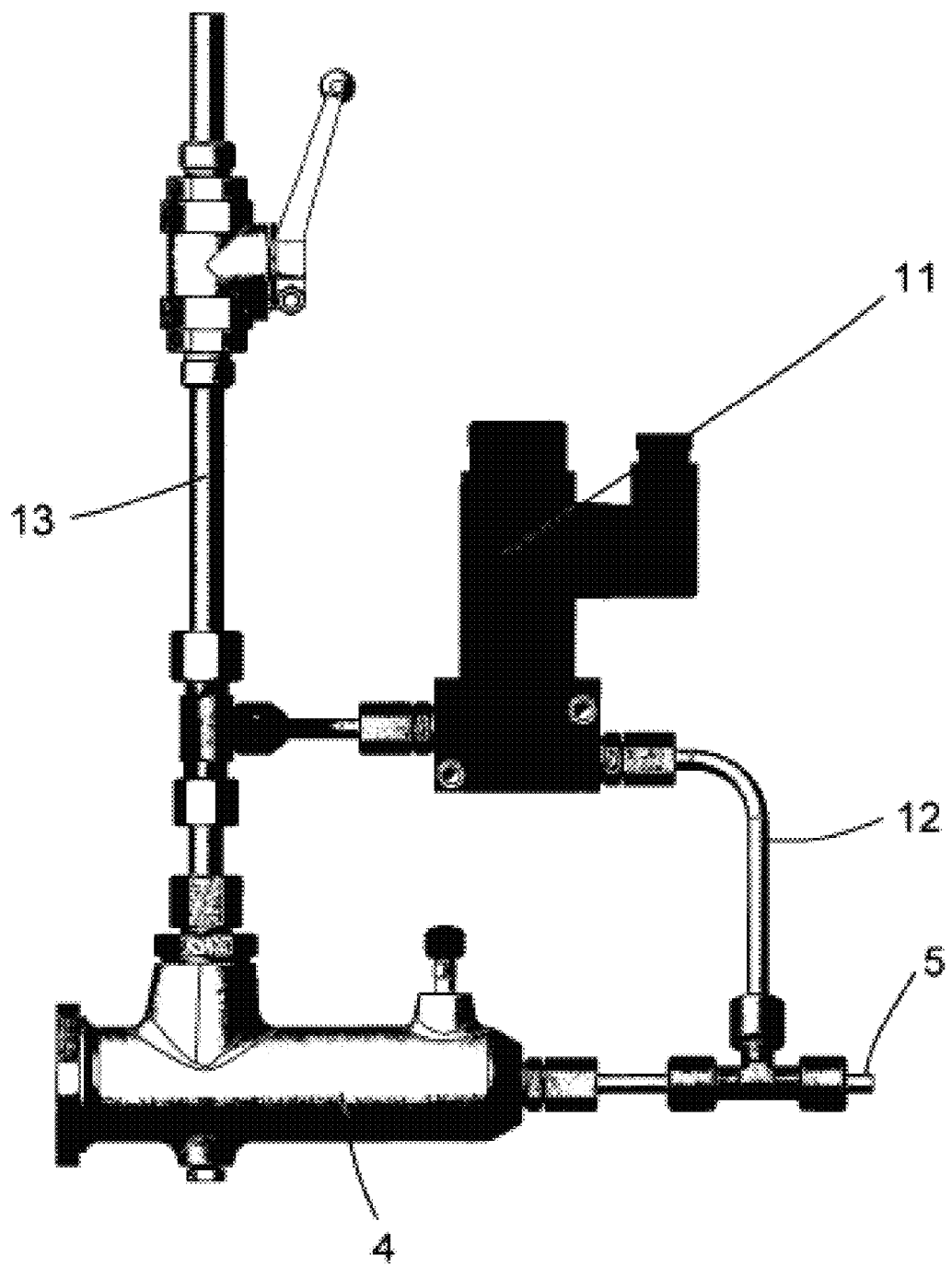
FIG. 3 is a fragmentary, side elevational view of an exemplary embodiment of a brake master cylinder with a bypass valve switched in parallel.

FIG. 3 shows a further development which, in particular, opens up the possibility of depressurizing the secondary circuit. For this purpose, a bypass valve 11 is provided, which is disposed in a bypass line 12 that connects the brake line 5 to a supply line 13 running to the storage tank (not shown) for the brake fluid. As shown in FIG. 3, the bypass valve 11 is, therefore, switched in parallel to the brake master cylinder 4.

The bypass valve 11 can, for example, be opened or closed by the test bench control. In line therewith, the bypass valve 11 can be activated electrically, hydraulically, or pneumatically. For example, the bypass valve 11 can be formed as a solenoid valve, wherein the solenoid valve is closed while an electric current is present and is open while the voltage input is currentless.

Provision of the bypass valve 11 has the following background: If a classical hydraulic actuation is provided in the primary circuit 1 (side of the brake actuator), failures can be treated easily. When the pump for the supply pressure of the brake actuator (which substitutes for the vehicle driver's braking foot) is switched off on the primary side, the pressure is immediately relieved, resulting in the force no longer acting on the brake master cylinder 4 and the pressure piston provided there. This also results in a simple and immediate reduction of the pressure in the secondary circuit of the brake system. If, however, the primary circuit comprises an electrically driven brake actuator 7—as it is suggested herein—it is no longer possible to spontaneously relieve the pressure. Due to the high friction, for example, in the planetary roller screw drive 9 but also in the electric motor 8, it is not possible to relieve the pressure in a fast and reliable manner. In line therewith, the plunger 6 cannot quickly return to a zero position without any active cooperation of the electromechanical brake actuator 7. In line therewith, the pressure in the secondary circuit (braking circuit) remains high as well. When the electric current is switched off, a significant residual pressure, therefore, still remains in the brake system. This can be disadvantageous for an emergency switchoff of the system, for example, in case the unit under test overheats.

To solve this problem, the configuration shown in FIG. 3 is suggested, wherein the bypass valve 11 is disposed in parallel with the brake master cylinder 4. Use of the bypass valve 11 and the bypass line 12 allows spontaneously depressurizing the brake system at any time without the encoder (plunger 6) at the brake master cylinder 4 having to be completely pulled out of the brake master cylinder 4. That is to say, that only in this case would it be possible to relieve the pressure through the brake master cylinder 4 and a bottom check valve provided there.

In the embodiment shown in FIG. 3, however, the bypass line 12 can be opened by the bypass valve 11, resulting in the pressure in the brake line 5 being spontaneously relieved through the supply line 13. As a result, the secondary circuit 2 can be brought into a safe state even if the primary circuit 1 is still fully activated, i.e., the brake actuator 7 is in the moved-out position in order to achieve a maximum brake pressure.

By the bypass valve 11, it is also possible to improve the repeat accuracy of the pressure build-up when the brake is applied. Due to the physical properties of seals and rubber elements in the brake master cylinder 4, their position is not always unique, with the result that, depending on the position of the elastic components, the same movement path of the brake actuator 7 or the plunger 6 generates different pressure effects in the braking circuit.

By the test bench control, however, it is possible to achieve the following method sequence when the brake pressure is generated: In the initial position, the brake actuator 7 with the plunger 6 is fully moved in, with the result that the pressure piston in the brake master cylinder 4 is in the open position. In line therewith, the bottom check valve that is usually provided in the brake master cylinder 4 is open. When the brake actuator 7 is actuated, the pressure piston in the brake master cylinder 4 moves the bottom check valve to its closed position, wherein the bypass line 12 is opened via the bypass valve 11. In line therewith, pressure cannot build up in the braking circuit yet.

When the bottom check valve is moved to its closed position, the rubber bearings and seals change their state, i.e., they are displaced and always assume the same position thereafter in a reproducible manner. Only thereafter will the bypass valve 11 be closed by the test bench control, with the result that, subsequently, the actual brake application can start and the brake pressure is increased.

When the brake fluid heats and expands in the test operating mode, the test bench control can be used to return the pressure piston to its initial position and to open the bottom check valve, in order to completely relieve the pressure in the brake system. Thereafter, the predefined reference position can again be reached by moving the bottom check valve to its closed position, in order to achieve reproducible conditions for the next brake application.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A test bench for testing a brake, comprising
a pressure generating assembly for providing a brake fluid with an increased hydraulic pressure, the pressure generating assembly operable to be actuated mechanically and operable to supply the brake fluid to the brake to actuate the brake;
a test bench control;
an electromechanical brake actuator comprising:
an electric motor operable to be activated by the test bench control; and
a planetary roller screw drive driven by the electric motor, the planetary roller screw drive being mechanically coupled to the pressure generating assembly to mechanically actuate the pressure generating assembly, wherein the pressure generating assembly comprises:
a brake master cylinder;
a pressure piston axially movable in the brake master cylinder based upon an effect of the brake actuator; and
a brake fluid storage tank connected to the brake master cylinder through a supply line;
a brake line connecting the brake master cylinder to the brake to be tested;
a bypass line connecting the supply line and the brake line; and
an activatable bypass valve disposed in the bypass line and activated such that:
the bypass valve is open when the test bench control does not request any actuation of the brake; and
the bypass valve is closed when the test bench control requests an actuation of the brake.

2. The test bench according to claim 1, wherein the planetary roller screw drive comprises:
a housing bushing with an internal thread having a given thread profile;
a drive shaft operable to be driven by the electric motor;
a roller cage operable to be driven in a rotary movement by the drive shaft; and
a plurality of axles carried by the roller cage, the axles extending in parallel to the drive shaft and each carrying at least one planetary roller in a rotating manner, each of the at least one planetary roller comprising an outer perimeter and a thread profile at the outer perimeter, the thread profile corresponding to the given thread profile; and
during a rotation of the drive shaft and the roller cage, the planetary rollers rotate in the internal thread and, therefore, produce an axial relative movement between the planetary rollers and the housing bushing.

3. The test bench according to claim 2, wherein:
the planetary roller screw drive comprises a plunger; and
the axial relative movement produces an axial bidirectional movement of the plunger.

4. The test bench according to claim 3, wherein the brake actuator comprises a position detecting assembly operable to detect a current position of the plunger.

5. The test bench according to claim 4, wherein the position detecting assembly comprises one of a rotary encoder, a Hall sensor, an inductive proximity sensor, and a capacitive proximity sensor.

6. The test bench according to claim 1, further comprising a motor control operatively connected to the electric motor and comprising a converter and a servo regulator, the test bench control being connected to the motor control.

7. The test bench according to claim 1, wherein:
the brake master cylinder comprises a bottom check valve through which a hydraulic pressure present in the brake master cylinder can be relieved when the bottom check valve is open;
the bottom check valve is operable to be opened and closed subject to a position of the pressure piston; and
the bottom check valve is open when the pressure piston is in an initial position.

8. The test bench according to claim 1, wherein:
the brake master cylinder comprises a bottom check valve through which a hydraulic pressure present in the brake master cylinder can be completely relieved when the bottom check valve is open;
the bottom check valve is operable to be opened and closed subject to a position of the pressure piston; and the bottom check valve is open when the pressure piston is in an initial position.

9. The test bench according to claim 8, wherein the following states are successively reached when brake application occurs:
an open state in which the pressure piston is in an open first position, the bottom check valve is open, and the bypass valve is open;
a reference state in which the pressure piston is axially displaced to a second position, the bottom check valve is closed by the pressure piston, and the bypass valve is open; and
a brake state in which the pressure piston is axially displaced to one of the second position and a third position that is axially more remote from the first position than the second position, the bottom check valve is closed by the pressure piston, and the bypass valve is closed by the test bench control.

10. The test bench according to claim 9, wherein actuation of the test bench comprises:
activating the brake actuator to move the pressure piston to the open first position in which the bottom check valve of the brake master cylinder is open;
activating the brake actuator to move the pressure piston and close the bottom check valve therein when the bypass valve is open;
closing the bypass valve; and
activating the brake actuator to further move the pressure piston and build up a brake pressure in the brake master cylinder and, therefore, start a brake application.

11. A method for actuating a test bench, comprising the steps of:
providing a test bench for testing a brake with:
a pressure generating assembly for providing a brake fluid with an increased hydraulic pressure, the pressure generating assembly operable to be actuated mechanically and operable to supply the brake fluid to the brake to actuate the brake;
a test bench control; and
an electromechanical brake actuator comprising:
an electric motor operable to be activated by the test bench control; and
a planetary roller screw drive driven by the electric motor, the planetary roller screw drive being mechanically coupled to the pressure generating assembly to mechanically actuate the pressure generating assembly;
providing the pressure generating assembly with:
a brake master cylinder having a bottom check valve through which a hydraulic pressure present in the brake master cylinder can be completely relieved when the bottom check valve is open;
a pressure piston axially movable in the brake master cylinder based upon an effect of the brake actuator, the bottom check valve being operable to be opened and closed subject to a position of the pressure piston and being open when the pressure piston is in an initial position; and
a brake fluid storage tank connected to the brake master cylinder through a supply line;
providing a bypass line connecting the supply line and the brake line and an activatable bypass valve disposed in the bypass line and activated such that:
the bypass valve is open when the test bench control does not request any actuation of the brake; and
the bypass valve is closed when the test bench control requests an actuation of the brake;
activating the brake actuator to move the pressure piston to the open first position in which the bottom check valve of the brake master cylinder is open;
activating the brake actuator to move the pressure piston and close the bottom check valve therein when the bypass valve is open;
closing the bypass valve; and
activating the brake actuator to further move the pressure piston and build up a brake pressure in the brake master cylinder and, therefore, start a brake application.

12. The method according to claim 11, further comprising successively reaching the following states when brake application occurs:
an open state in which the pressure piston is in an open first position, the bottom check valve is open, and the bypass valve is open;
a reference state in which the pressure piston is axially displaced to a second position, the bottom check valve is closed by the pressure piston, and the bypass valve is open; and
a brake state in which the pressure piston is axially displaced to one of the second position and a third position that is axially more remote from the first position than the second position, the bottom check valve is closed by the pressure piston, and the bypass valve is closed by the test bench control.

* * * * *